United States Patent [19]
van Lengerich

[11] Patent Number: 4,984,514
[45] Date of Patent: * Jan. 15, 1991

[54] EXTRUDER APPARATUS FOR PRODUCING AN AT LEAST PARTIALLY BAKED PRODUCT HAVING A COOKIE-LIKE CRUMB STRUCTURE INCLUDING A POST EXTRUSION MICROWAVE DEVICE

[75] Inventor: Bernhard H. van Lengerich, Ringwood, N.J.

[73] Assignee: Nabisco Brands, Inc., East Hanover, N.J.

[*] Notice: The portion of the term of this patent subsequent to Jul. 3, 2007 has been disclaimed.

[21] Appl. No.: 362,376

[22] Filed: Jun. 7, 1989

[51] Int. Cl.<sup>5</sup> ........................ A21C 3/04; A47J 27/12; A23P 1/00

[52] U.S. Cl. ........................................ 99/353; 99/348; 99/355; 99/451; 99/483; 366/85; 366/291

[58] Field of Search ................ 99/331, 348, 352, 353, 99/355, 357, 426, 443 C, 451, 467, 483, 450.1; 366/83–86, 291; 425/208, 209, 131.1

[56] References Cited

U.S. PATENT DOCUMENTS

| | | | |
|---|---|---|---|
| 1,625,022 | 4/1927 | Fousek. | |
| 2,120,138 | 6/1938 | Mathews et al. | 99/81 |
| 2,183,693 | 12/1939 | Rasch | 107/14 |
| 2,488,046 | 11/1949 | Werner et al. | 107/29 |
| 2,582,542 | 1/1952 | Hein | 107/29 |
| 2,838,012 | 6/1958 | Weidenmiller et al. | 107/29 |
| 2,838,013 | 6/1958 | Weidenmiller et al. | 107/29 |
| 3,021,220 | 2/1962 | Going et al. | 99/92 |
| 3,064,589 | 11/1962 | Genich | 107/29 |
| 3,158,486 | 11/1964 | Mork et al. | 99/86 |
| 3,195,868 | 7/1965 | Loomans et al. | 259/104 |
| 3,215,094 | 11/1965 | Oldershaw et al. | 107/54 |
| 3,275,449 | 9/1966 | Fritzberg | 99/80 |
| 3,393,074 | 7/1968 | Ehrlich | 99/92 |
| 3,458,321 | 7/1969 | Reinhart | 99/80 |
| 3,462,276 | 8/1969 | Benson | 99/81 |
| 3,480,445 | 11/1969 | Slaybaugh | 99/83 |
| 3,490,750 | 1/1970 | Brennan | 259/104 |
| 3,492,127 | 1/1970 | Ketch et al. | 99/86 |
| 3,615,675 | 10/1971 | Wisdom | 99/83 |
| 3,682,652 | 8/1972 | Corbin et al. | 99/83 |
| 3,692,535 | 9/1972 | Norsby | 99/92 |
| 3,732,109 | 5/1973 | Poat et al. | 99/83 |
| 3,753,729 | 8/1973 | Harms et al. | 99/82 |
| 3,767,421 | 10/1973 | Gulstad et al. | 426/153 |
| 3,767,422 | 10/1973 | Levitz | 426/152 |
| 3,769,034 | 10/1973 | Dreier, Jr. et al. | 426/151 |
| 3,861,287 | 1/1975 | Manser | 99/348 |
| 3,908,025 | 9/1975 | Miller et al. | 426/623 |
| 3,922,369 | 11/1975 | Glicksman et al. | 426/548 |
| 3,987,207 | 10/1976 | Spaeti et al. | 426/99 |

(List continued on next page.)

Primary Examiner—Timothy F. Simone

[57] ABSTRACT

An extruder operating to continuously mix, at least partially bake and extrude a preselected formulation of ingredients to provide an at least partially baked output product which, upon final baking, exhibits a cookie-like crumb structure with structural integrity. The extruder includes an added water inlet port downstream from a feed port means. A screw-type element is rotatably arranged in the extruder to vigorously mix and convey at least certain ingredients of the preselected formulation, including flour and oil, input through the feed port means, wherein the total water content, by weight, of the ingredients is less than a preselected amount. A temperature control means operates to heat treat the ingredients upstream from the added water inlet port during the vigorous mixing and conveyance by the screw-type element. A source of water is coupled to the added water inlet port to add a preselected amount of water to the ingredients to increase the water content and modify the consistency of the ingredients after heat treatment and vigorous mixing and conveying. The screw-type element downstream from the added water inlet port is arranged for a gentle mixing and conveyance of the ingredients and added water. In addition, a microwave device is coupled to the downstream end of the extruder to leaven, brown and final bake the output product.

17 Claims, 2 Drawing Sheets

U.S. PATENT DOCUMENTS

| | | | |
|---|---|---|---|
| 4,020,187 | 4/1977 | McCulloch et al. | 426/72 |
| 4,038,481 | 7/1977 | Antrim et al. | 536/56 |
| 4,039,168 | 8/1977 | Caris et al. | 259/9 |
| 4,044,159 | 8/1977 | Lutz | 426/302 |
| 4,044,661 | 8/1977 | Balaz | 99/355 |
| 4,099,455 | 7/1978 | Wenger et al. | 99/450.1 |
| 4,104,463 | 8/1978 | Antrim et al. | 536/56 |
| 4,126,710 | 11/1978 | Jaworshi et al. | 426/589 |
| 4,128,051 | 12/1978 | Hildebolt | 99/348 |
| 4,190,410 | 2/1980 | Rhodes | 425/239 |
| 4,217,083 | 8/1980 | Machuque | 425/198 |
| 4,218,480 | 8/1980 | Dyson et al. | 426/19 |
| 4,219,580 | 8/1980 | Torres | 426/549 |
| 4,225,630 | 9/1980 | Pitchon | 426/623 |
| 4,239,906 | 12/1980 | Antrim et al. | 536/56 |
| 4,245,552 | 1/1981 | Small et al. | 99/483 |
| 4,277,464 | 7/1981 | Rewssner et al. | 424/177 |
| 4,285,271 | 8/1981 | Falck et al. | 99/348 |
| 4,318,931 | 3/1982 | Schiffman et al. | 426/243 |
| 4,322,202 | 3/1982 | Martinez | 425/208 |
| 4,344,975 | 8/1982 | Seiler | 426/285 |
| 4,350,713 | 9/1982 | Dyson et al. | 426/243 |
| 4,379,171 | 4/1983 | Furda et al. | 426/291 |
| 4,394,395 | 7/1983 | Rostagno et al. | 426/285 |
| 4,418,088 | 11/1983 | Cantenot | 426/549 |
| 4,431,674 | 2/1984 | Fulger et al. | 426/18 |
| 4,438,146 | 3/1984 | Colby et al. | 426/448 |
| 4,454,804 | 7/1984 | McCulloch | 99/348 |
| 4,455,333 | 6/1984 | Hong et al. | 426/94 |
| 4,465,447 | 8/1984 | Cheigh et al. | 425/72 |
| 4,465,452 | 8/1984 | Masuzawa | 425/308 |
| 4,478,857 | 10/1984 | Stauss | 426/72 |
| 4,492,250 | 1/1985 | Levine | 425/142 |
| 4,497,850 | 2/1985 | Gould et al. | 426/560 |
| 4,500,558 | 2/1985 | Fulger et al. | 426/463 |
| 4,503,080 | 3/1985 | Brabbs et al. | 426/94 |
| 4,563,358 | 1/1986 | Mercer et al. | 426/89 |
| 4,568,550 | 2/1986 | Fulger et al. | 426/19 |
| 4,568,551 | 2/1986 | Seewi et al. | 426/99 |
| 4,618,499 | 10/1986 | Wainwright | 426/283 |
| 4,650,685 | 3/1987 | Persson et al. | 426/285 |
| 4,661,360 | 4/1987 | Smith | 426/94 |
| 4,664,921 | 5/1987 | Seiden | 426/94 |
| 4,668,519 | 5/1987 | Dartey et al. | 426/548 |
| 4,685,878 | 8/1987 | Pinto | 425/202 |
| 4,693,899 | 9/1987 | Hong et al. | 426/94 |
| 4,741,264 | 5/1988 | McPeak | 99/483 |
| 4,752,484 | 6/1988 | Pflaumer et al. | 426/94 |
| 4,756,921 | 7/1988 | Calandro et al. | 426/560 |
| 4,762,723 | 8/1988 | Strong | 426/283 |
| 4,764,388 | 8/1988 | Sullivan et al. | 426/311 |
| 4,770,890 | 9/1988 | Giddey et al. | 426/549 |
| 4,771,915 | 9/1988 | Cand et al. | 222/56 |
| 4,777,057 | 10/1988 | Sugisawa et al. | 426/412 |
| 4,778,690 | 10/1988 | Sadel, Jr. et al. | 426/560 |
| 4,786,514 | 11/1988 | Wiedmann | 426/231 |
| 4,844,937 | 7/1989 | Wilkinson et al. | 426/559 |
| 4,844,938 | 7/1989 | Amamoto et al. | 426/589 |
| 4,851,247 | 7/1989 | Greenhouse et al. | 426/250 |

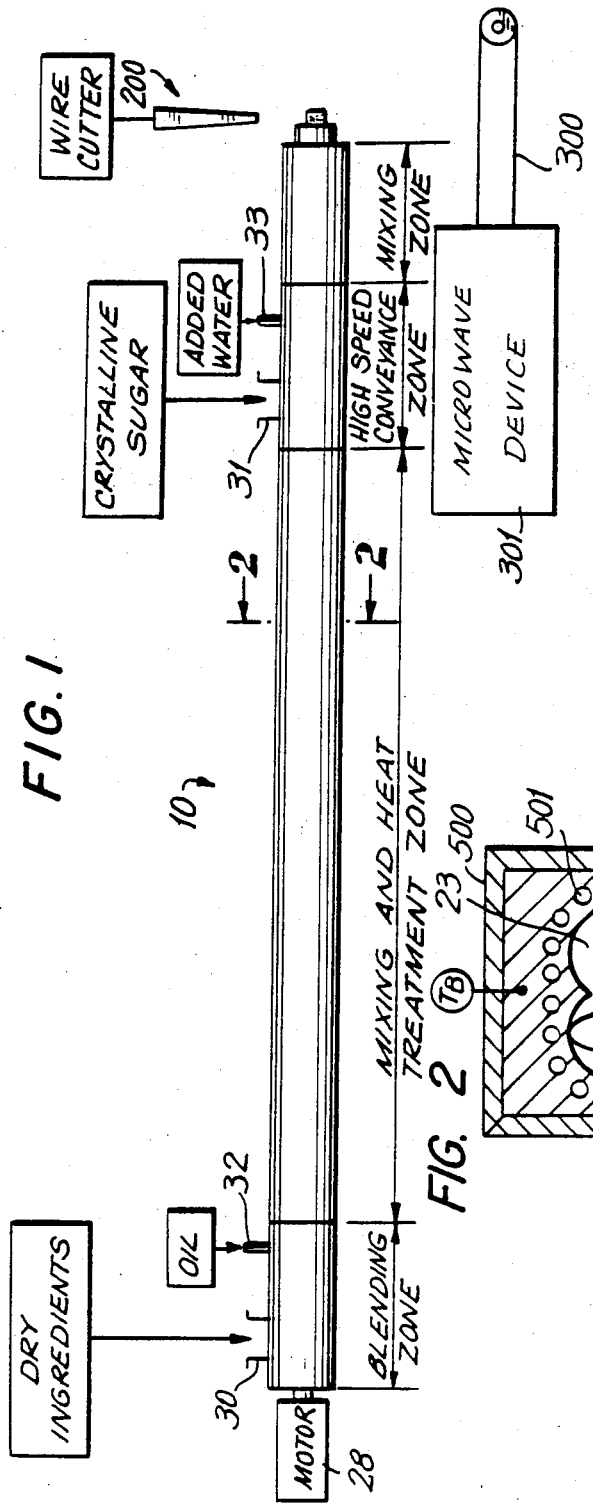
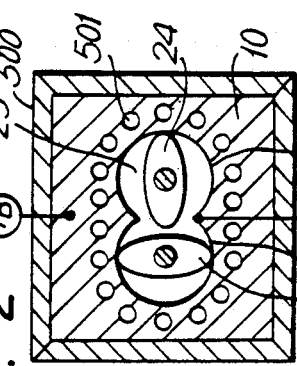
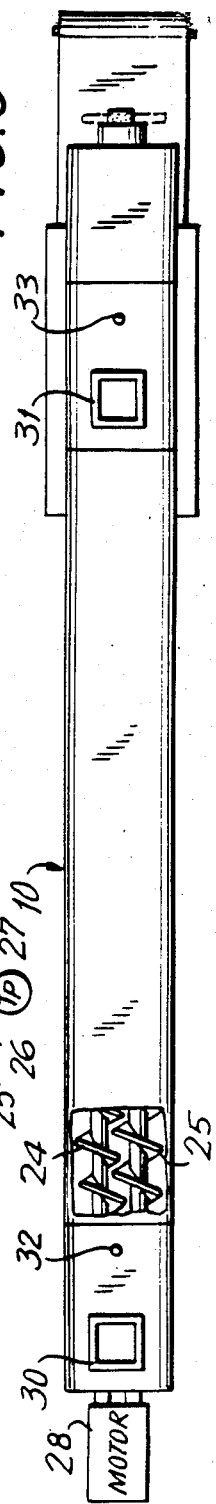

EXTRUDER APPARATUS FOR PRODUCING AN AT LEAST PARTIALLY BAKED PRODUCT HAVING A COOKIE-LIKE CRUMB STRUCTURE INCLUDING A POST EXTRUSION MICROWAVE DEVICE

FIELD OF INVENTION

The present invention is directed to an apparatus for continuously producing an at least partially baked product having a cookie-like crumb structure and, more particularly, to an apparatus including an extruder operating to continuously mix, at least partially bake and extrude a preselected formulation of ingredients to provide an at least partially baked output product which, upon final baking, exhibits a cookie-like crumb structure. In addition, a microwave device is coupled to the downstream end of the extruder to finally bake the output product.

BACKGROUND OF THE INVENTION

An extruder generally comprises a screw-like element rotatably mounted within a bore or screw channel formed in a longitudinally extended extruder barrel. The screw-like element includes various thread configurations which may alternate with mixing projections of various shapes and sizes such that the rotation of the screw-like element conveys and mixes ingredients which are fed into the bore through an inlet port arranged at the upstream end of the extruder barrel. Typically, an extrusion port or die is mounted at the downstream most end of the extruder barrel whereby the ingredients which have been mixed and conveyed by the rotating screw-like element are forced through the die to provide an output product which comprises a thorough mixture of the ingredients fed through the inlet port of the extruder.

In one advantageous embodiment of an extruder, twin screws are arranged within side-by-side, communicating bores which have a figure eight cross-section. The screw threads and mixing projections of the twin screws intermesh with one another in a self-cleaning action to mix, convey and otherwise mechanically work the various ingredients fed into the inlet port. The dimensions of the communicating bores and elements of the twin screws, as well as the speed of rotation of the twin screws can be designed such that the operation of the extruder introduces high compressive and shearing forces to the ingredients being mixed and conveyed throughout certain sections of the extruder to raise the temperature and thereby heat treat the ingredients during their conveyance through the extruder.

The heat treatment operation of an extruder also depends upon the viscosity of the mixed ingredients being conveyed. Generally, the viscosity must be high enough so that the viscous resistance of the mixture to the shearing and compressive forces introduced by the screw-like element results in sufficient friction to raise the temperature of the mixed ingredients. An extruder may also include a supplemental heat source, such as electric heater in each barrel section arranged to surround the screw channel, to introduce heat, as for example, by conduction into the ingredients. Such a supplemental heat source could be used when the viscosity of the mixture is not high enough to provide the friction required for heat treatment. The extruder barrel of the extruder may also include tubing for the circulation of, e.g., hot or cold water for additional temperature control of the screw channel. Moreover, a thermostat control can be used to maintain preselected temperatures at certain longitudinal sections or zones of the extruder. The thermostat may, for example, activate the electric heater to raise the temperature when the temperature level of a zone falls below the preselected level and further activate a source of cooling water through the tubing when the temperature level in the zone rises above the preselected level.

Extruders, particularly twin screw extruders, have been used widely in the food industry to continuously mix ingredients to produce a raw dough and also to at least partially cook the ingredients, as they are mixed, to produce a partially or fully cooked food product. Typically, extruders are used to produce cereals, snacks, pet foods and other products which generally are expanded upon extrusion through a die and which have relatively low amounts of oil as a percentage of the total weight of the food product. It has been found, for example, that the presence of oils above certain levels causes processing problems such as surging and product characteristics such as oil separation, which are undesirable. More specifically, upon extrusion, separated oil may appear as a coating on the remaining dough mass or periodically discharge separately from the remaining dough mass. Oil separation may be caused or aggravated by high pressure areas within the extruder as, for example, at the extruder die and within high compressive force zones in a heat treatment section of the extruder. In such areas, the compressive forces literally squeeze the oil from the dough mass.

In particular, it has been found that the use of an extruder to at least partially bake a cookie dough, which typically comprises a formulation including flour, added water and high amounts of both oil and crystalline sugar, may result in oil separation and excessive dissolution of the crystalline sugar. Traditionally, a baked cookie exhibits a crumb structure having structural integrity (i.e. the product does not readily crumble apart). A crumb structure is a significant characteristic which affects the texture of a cookie product. Oil separation caused by the high pressure, high temperature and/or turbulent conditions generated by the extruder, as required to achieve thorough mixing and heat treatment of a product within the extruder, tends to preclude a crumb structure. Moreover, the presence of high amounts of both oil and crystalline sugar with water above a certain level promotes the dissolution of the sugar in the water to increase the relative amount of hydrophilic mass which in turn, tends to cause further oil separation. The dissolved sugar may also result in an excessively hard texture for the final product. For these reasons, extruders have not been heretofore successfully utilized to at least partially bake a cookie dough to produce a final product having a cookie-crumb-like structure with structural integrity.

Conventional cookie production involves forming a cookie dough which is cut into pieces followed by baking of the pieces. Low temperatures, typically at about room temperature, are used to form the dough in a batch process. The low temperature mixing generally avoids separation of oil from hydrophilic dough components. While baking temperatures in a conventional oven, such as a band oven, may promote oil separation, there is no mixing or pressing action performed at the baking temperatures, as occurs in an extruder, to squeeze the oil from the dough mass. Any oil separation which may occur in such ovens does not generally interfere with continuous operability of the cookie production process as it would in a continuous cooker/extruder process.

SUMMARY OF THE INVENTION

It is a primary objective of the present invention to provide an extruder apparatus which is operable in accordance with a novel process, as disclosed in copending U.S. application Ser. No. 362,747, entitled "Production of Cookies With Extrusion and Post Extrusion Baking", filed on even date herewith, which is hereby expressly incorporated by reference. The process of the co-pending application is directed to a process to continuously mix and at least partially bake the ingredients of a dough formulation to produce a partially baked output product which, when fully baked, has a cookie-crumb-like structure with structural integrity. Generally, the apparatus of the invention comprises a screw-type extruder, preferably a twin screw extruder, having an upstream dry ingredient inlet port, an upstream liquid feed port, a downstream added water inlet port and a downstream dry ingredient inlet port adjacent to the downstream added water inlet port and a microwave device coupled to the downstream end of the extruder. The screw configuration of the extruder comprises a novel sequence of conveying, mixing and kneading elements arranged relative to the upstream and downstream inlet ports so that ingredients comprising flour and oil can be input through the upstream inlet ports, conveyed and mixed under conditions to elevate the temperature for heat treatment to partially bake the ingredients comprising flour and oil within the extruder by the barrel sections and the action of the screw elements in a heat treatment zone upstream from the downstream inlet ports.

The partial baking by the extruder of the ingredients comprising flour and oil input through the upstream inlet ports in the heat treatment zone with an elimination or significant reduction of added water or a source of added water at the upstream end of the extruder results in a reduction in oil separation from the mass of flour and oil which is sufficient to eliminate surging in the extruder and undesirable product characteristics such as a surface layer of oil on the extruded dough mass. The extruder is generally operated at relatively low pressure to further minimize oil separation.

The viscosity of an oil and flour formulation when admixed in an extruder with a minimal amount or no added water, is too low for viscous resistance heat treatment processing. Generally, if the amount of added water is too low, the extrudate will tend to be a slurry-like mass which is not suitable for friction heat treatment within the extruder or for shaping and cutting in post extrusion processing. Thus, a supplemental heat source is used to heat treat the ingredients comprising oil and flour while the screw configuration is designed for vigorouous mixing and increasing degree of fill within the free volume of the screw channel to provide an even heat distribution throughout the thoroughly mixed ingredients.

When added water or a source of added water is provided in the extrudate, the consistency can be modified to provide a mixture having sufficient formability and machinability for shaping and cutting into a final product. As the amount of added water is increased, the extrudate consistency changes to a dough-like elastic mass until a threshold level is reached. At this level, additional water reduces the consistency and further addition of water may result in substantial oil separation and extruder surging.

The introduction of added water in amounts below the threshold level results in the added water mixing with glutens in the flour to provide a mass with elastic properties which is hydrophilic in nature. The elastic hydrophilic mass, while improving the formability and machinability of the formulation, will increase the tendency toward oil separation under certain temperature and pressure conditions.

Consistencies suitable for forming or cutting operations depend upon the particular operation and particular equipment utilized. For example, a consistency which is too high for wire cutting may be suitable for sheeting or rotary molding. For rotary molding, the consistency at about the threshold level is suitable. For extrusion through a die, for producing a sheet, or for wire cutting, the consistency should be less than the threshold value. However, to reduce the risk of substantial oil separation in the extruder or in post extrusion forming operations and to reduce post extrusion baking times, it is generally preferred that the amount of water added be less than the amount needed to reach the threshold or maximum consistency. Thus, it is generally preferred that the water content of the dough-like mixture is such that any additional water would further increase the consistency of the dough-like mixture.

If the ratios of the amounts of the ingredients are kept constant then: the amount of water added which is needed to reach the threshold level of consistency will depend upon the heat treatment of the ingredients. Generally, the longer the heating, or the higher the temperature of heating, the lower is the amount of water needed to reach the threshold level of consistency.

The heat treated mass temperature before and/or during admixing with water or a source of water should be sufficiently low so that the added water does not result in substantial separation of oil and extruder surging. The reduction of the temperature of the heat treated mass substantially reduces mobility and immiscibility of the water and oil phases. Also, it has been observed that the oil is most likely to separate from the remaining mass at the points of highest pressure, such as at the extruder die. Generally, the lower the pressures encountered by the heat treated mass upon or subsequent to the addition of the water, the less the heat treated mass needs to be cooled to avoid substantial oil separation and extruder surging.

If pressures are sufficiently low (such as when an extruder die is not utilized) and if the mass temperature during heat treatment is sufficiently low, little or substantially no cooling may be needed to avoid substantial oil separation or extruder surging. However, higher heat treated mass temperatures are preferred for: (1) the promotion of browning and flavor development, and (2) reduced post extrusion heating times. Thus, it is generally preferred that the heat treated mass be heated to a high temperature and that the heat treated mass temperature be reduced before and/or during admixing it with water or source of water. Cooling of the heat treated mass is preferably initiated prior to and continues during admixing it with water or a liquid source of water to reduce the risk of substantial oil separation upon mixing or extrusion.

Accordingly, the downstream added water inlet port is arranged downstream from the barrel sections and screw elements operating to elevate the temperature of the ingredient mix comprising oil and flour and proximate the upstream end of a cooling and gentle mixing zone (i.e. a relatively low temperature, low pressure, low shear and low compressive force mixing zone) of the extruder to obtain a substantially homogeneous dough-like mixture at the extruder output. The thorough yet gentle mixing of the water throughout the cooling of the heat-treated mass at low pressure enables the added water to help disperse the cookie ingredients and to modify the consistency of the mass to provide a dough-like output product from the extruder. Unacceptable oil separation is avoided due to the relatively low water addition, low temperature and low pressure operation of the extruder downstream from the added water inlet port.

Crystalline sugar is added to the extruder through the upstream and/or downstream dry ingredient inlet ports.

The relative amount of at least one crystalline sugar or granulated sugar, such as sucrose, which is input through the upstream dry ingredient inlet port with the flour and oil and subjected to the heat treatment, is used to control the tenderness and crunchiness of the final product. More specifically, the addition of a portion of the crystalline sugar to the cookie-dough formulation through the upstream inlet port with the added water input through the downstream added water inlet port, to minimize the dissolution of sugar, tends to promote a crunchy texture to the crumb structure of the final product. Addition of all or a portion of the crystalline sugar through the downstream dry ingredient inlet port, which is arranged downstream from the barrel sections and screw elements operating to elevate the temperature of the ingredients for heat treatment, tends to avoid excessive sugar dissolution and promotes a tender texture in the final product. Pursuant to the process of the co-pending application, 15%-85% of the total crystalline sugar is added through the upstream inlet port and 15%-85% of the total crystalline sugar is added through the downstream dry ingredient feed port depending upon the desired crunchiness of the final product.

Pursuant to a feature of the invention, the screw configuration immediately below the downstream dry ingredient inlet port is formed to provide a relatively high speed conveyance section such that a substantial amount of crystalline sugar can be readily added to the cooled, heat-treated ingredients already in flow within the extruder, at a rate which is sufficient to obtain all or substantially all of the sugar within the final output product required for a cookie dough formulation and without a sugar back fill flow out of the downstream inlet port.

Moreover, a downstream input of all or a portion of the crystalline sugar through the downstream dry ingredient inlet port reduces the total mass which must be heat-treated by the extruder and facilitates the cooling of the heat-treated mass by adding the relatively cool bulk of the crystalline sugar at the cooling zone of the extruder.

The screw configuration immediately downstream from the relatively high speed conveyance section and downstream added water inlet port can be formed to provide alternating conveying and mixing sections which operate at lower pressure and shear than the upstream sections to thereby thoroughly mix the added sugar and added water in relatively gentle action with the other partially baked ingredients input at the upstream inlet port.

In this manner, the added water and all or a portion of the crystalline sugar is added to the formulation subsequent to the heat treatment of the other ingredients so that the water does not modify the consistency of the heat treated mass until after the high temperature of the heat treatment zone. Thus, the added water and crystalline sugar are not exposed to conditions which can cause oil separation or excessive dissolution of the sugar. This will promote a crumb structure in the final product which is either tender or crunchy, depending upon the level of upstream crystalline sugar addition, but not excessively hard.

Moreover, the high speed conveyance section permits the addition of relatively large amounts of sugar, as a percentage of the total weight of the final food product, for thorough mixing with the other ingredients by increasing the intake capability of the extruder directly beneath the downstream dry ingredient inlet port. More specifically, the high speed conveyance section acts to rapidly convey the sugar downstream as it is poured into the downstream inlet port to thereby prevent a build up and possible back flow of sugar at the downstream inlet port.

The downstream inlet ports are spaced sufficiently upstream from the end of the extruder casing to provide an ample distance along the twin screws so as to enable the placement of subsequent conveying and mixing sections to thoroughly but gently mix the added water and added crystalline sugar throughout the other heat-treated, cooled ingredients.

The output product is a partially baked, homogenous cookie dough-like mass including added water and crystalline sugar without excessive dissolution of the added crystalline sugar and with a sufficient total water content for forming and shaping. The extruder according to the invention is operated such that the temperature and pressure acting upon the food product near the extrusion die, while sufficient to force the product through the extrusion die, is sufficiently low so as to prevent oil separation or a flash off of moisture and thereby limit the expansion of the product upon extrusion. Thus, the cookie-dough-like product output does not crumble apart and remains dough-like in consistency for shaping, cutting and further processing before final baking. Shaped or cut pieces of the partially-baked, extruded dough are leavened and further browned using microwave energy. Pursuant to the invention the microwave device is coupled to the downstream end of the extruder to finally bake the output product.

BRIEF DESCRIPTION OF THE DRAWINGS

FIG. 1 is a side view of an extruder and a microwave device of the present invention.

FIG. 2 is an end cross-section of the extruder taken along line 2—2 of FIG. 1.

FIG. 3 is a top view, partially broken away of the extruder of FIG. 1.

DETAILED DESCRIPTION

Figure 4:
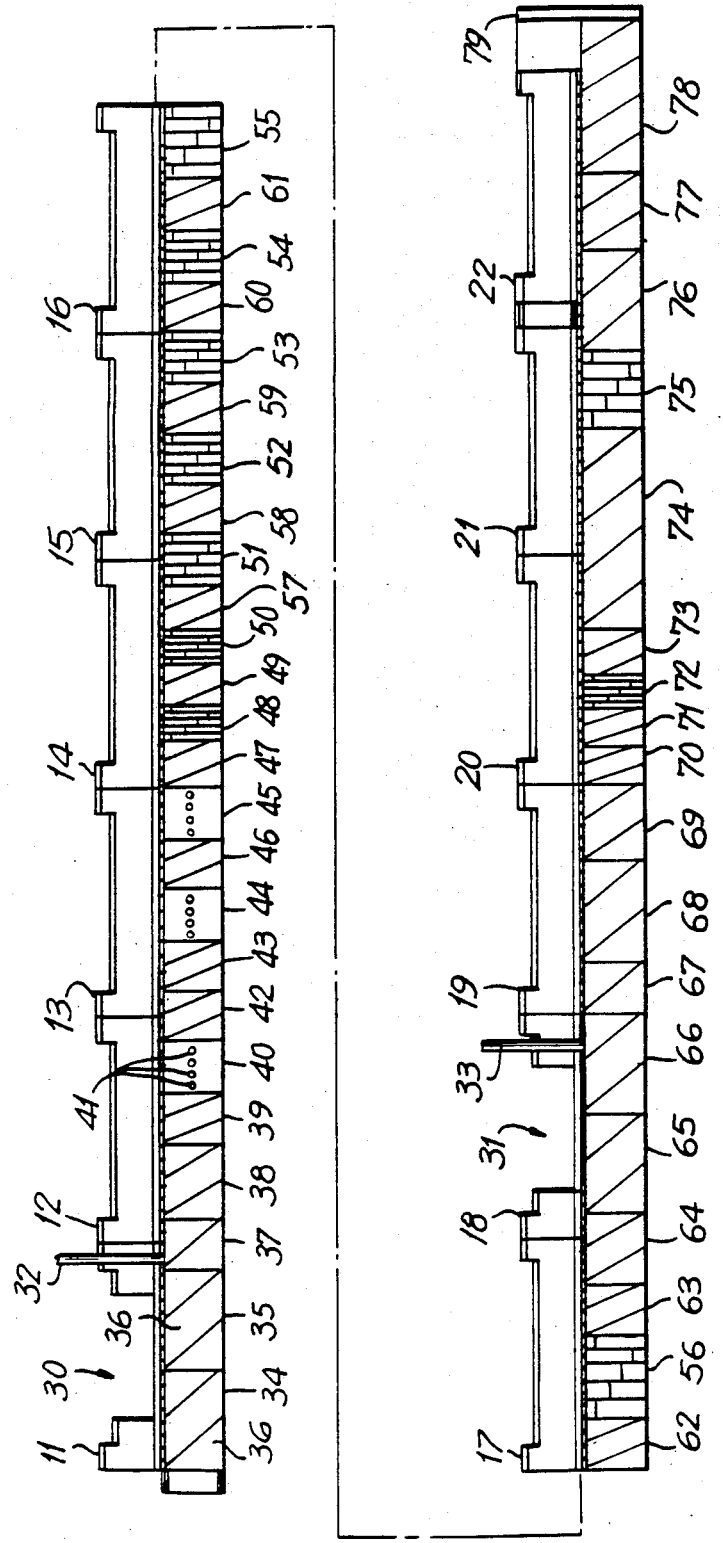
FIG. 4 is a schematic representation of the screw configuration of the extruder of FIG. 1.

Referring now to the drawings and initially to FIG. 1, there is illustrated a side view of an extruder 10 arranged according to the present invention. The extruder 10 comprises a plurality of barrel sections, e.g., twelve barrel sections 11-22 (See FIG. 4), each of which includes a figure eight cross-section bore or screw channel 23 formed therethrough (see FIG. 2).

The sections 11–22 are fastened end-to-end, to one another with the respective bore sections 23 axially aligned, as is well known, to provide the extruder barrel of the extruder 10.

In this manner, twin screws 24, 25 can be arranged in an intermeshing arrangement, to extend through communicating screw channels 26, 27 of the figure eight cross-section bore 23 from one end of the extruder barrel formed by the barrel sections to the other end thereof. The twin screws 24, 25 are coupled to an electric motor 28, arranged adjacent the upstream end of the extruder for rotation within the screw channels 26, 27.

A first dry ingredient feed port 30 is provided in barrel section 11 and a second dry ingredient feed port 31 is provided in barrel section 18. In addition, a first liquid feed 32 is arranged between barrel sections 11 and 12 and a second liquid feed 33 is provided in barrel element 18.

As illustrated in FIG. 1, the extruder is divided into a blending zone, a heat treatment zone, a conveyance zone and a mixing zone.

Referring now to FIG. 4, there is illustrated, in schematic form, a specific screw configuration for each of the twin screws 24, 25. The illustrated screw configuration is now described as a representative embodiment of the present invention. Each of the screws 24, 25 comprises a series of elements intermeshing with an adjacent identical series of elements of the other screw 24, 25. Screw elements 34, 35, the upstream most elements, are arranged directly beneath the first dry ingredient feed port 30. The screw elements 34, 35 each include a continuous screw-like thread 36 to rapidly convey dry ingredients such as flour and a portion of the crystalline sugar into the screw channel 23. Each of the elements 34, 35 comprises an 80/80/SK screw element which indicates that the screw-like thread has a pitch of 80 and that each element is 80 mm in length. The SK designation indicates a shuffle kneader which includes an undercut thread to catch and convey dry ingredients as they are input through the dry ingredient feed port 30. The first liquid feed port 32 is arranged adjacent the first dry ingredient feed port 30 for input of oil. The screw elements 34, 35 generally comprise the blending zone of the extruder.

A screw element 37 is arranged immediately downstream from the 80/80/SK elements 34, 35 and comprises an 80/40 screw element (i.e. a pitch of 80 and a length of 40 mm). The screw element 37 is followed immediately by a 60/60 screw element 38 and a 40/40 screw element 39. The progressively shorter, lower pitch screw elements 37, 38, 39 decrease the speed of conveyance to thereby increase the degree of fill of the input oil and flour ingredients within the bore 23. Degree of fill refers to the percentage of the free volume of the bore 23 occupied by ingredients being conveyed by the screw elements 24, 25.

An igel element 40, which is 40 mm in length, is arranged immediately downstream from the screw element 39. An igel element includes churning projections 41 to provide a chopping action to the ingredients within the bore 23. The igel element 40 does not itself substantially convey material which causes a further increase in the degree of fill. The through put flow of ingredients through the igel element 40 is caused by the pushing action on the ingredients by the screw elements 34, 35, 37, 38 and 39 upstream from the igel element 40.

Two 40/40 screw elements 42, 43 are arranged immediately downstream from the igel element 40 to continue the conveyance of the ingredients. Two additional 40 mm igel elements 44, 45 are provided downstream from the screw element 43. These igel elements 44, 45 are spaced from one another by a 40/40 screw element 46. Moreover, an additional 40/40 screw element 47 is arranged immediately downstream from the igel element 45. The igel elements 44, 45 and screw elements 46, 47 thereby provide alternating elements to chop, convey, chop and convey the ingredients. This sequence gradually increases the degree of fill and churns the ingredients to afford a better mixing of the ingredients.

A first kneading block element 48 is positioned directly downstream from the screw element 47. The kneading block element is used to mix the ingredients and comprises a KB/45/5/20 element. This indicates that it is a kneading block having 45° right hand angle staggered kneading discs, relative to one another around the axis of rotation of the screw, 5 total kneading discs in the element and the element is 20 mm long.

The kneading element 48 is followed by a 40/40 screw element 49. Thereafter, there is an alternating sequence of kneading block elements 50–56 and interposed screw elements 57–63. Each of the intermediate screw elements 57–63 comprises a 40/40 screw element while the kneading block elements 50–56 comprise, in downstream order, a KB/45/5/20 element (kneading block 50), four KB/45/5/40 elements (kneading blocks 51–54) and two KB/45/5/60 elements (kneading blocks 55–56).

The gradual increase in size of the kneading block elements 50–56 and relatively short, low pitch screw elements 57–63 in-between the successive kneading block elements causes a continuing increase in degree of fill and a vigorous mixing of the ingredients.

Each of the barrel elements 11–22 includes electrical heating elements 500 and cooling water flow tubing 501 to control the temperature of the barrel element. Such a temperature controlled barrel element comprises, for example, a model ZSK-57 extruder barrel element manufactured by Werner & Pfleiderer. The viscosity of the ingredients comprising flour and oil is not sufficient for friction heating due to the vigorous mixing action of the kneading block elements 50–56. Accordingly, the electrical heating elements of barrel elements 12–16 are operated to raise the temperature of the ingredients. The electric heating of the barrel elements 12–16 are operated to raise the temperature of the barrels to as high as possible, e.g. at least 350° F., for a given throughput rate to promote Maillard browning and flavor development and to reduce the amount of post extrusion heat treatment required for final baking.

Thus, the ingredients comprising flour and oil fed through the first dry ingredient feed port 30 and first liquid feed port 32 are thoroughly mixed and heat-treated by the overall conveying, churning and mixing action of the screws 24, 25 and heating effect of the barrel sections 12–16 upstream from the second dry ingredient feed port 31 and the second liquid feed port 33. The barrel sections 12–16 generally comprise the heat treatment zone of the extruder. The term "vigorous" as used herein means a mixing action which is sufficient to thoroughly mix the ingredients input through the first dry ingredient feed port 30, including the flour, oil, and, optionally, crystalline sugar, and to facilitate distribution of the heat applied by the heating coils throughout the ingredients. In addition, the term relates to increasing the degree of fill to a level accomodating heat conduction from the heating elements through the screw channel 23 and into the ingredients.

The second liquid feed 33 is provided in barrel section 18 for the introduction of added water or a source of added water. As noted above, the added water modifies the consistency of the heat treated ingredients comprising flour and oil to provide a mass having sufficient formability and machinability for post extrusion processing. Moreover, a cooling water flow is provided in the barrel sections 17 and 18 to reduce the temperature of the ingredients within the barrel sections by conduction and thereby reduce the tendency toward oil separation.

Immediately downstream from the last screw element 63 of the alternating screw and kneading block elements is a high speed conveyance zone comprising a series of screw elements 64-68 of generally increasing length and screw pitch. As illustrated in FIG. 4, the series of screw elements 64-68 are located immediately upstream, directly beneath and immediately downstream from the second dry ingredient feed port 31, in barrel sections 17, 18 and 19.

The screw elements 64-68 comprise 60/60, 80/80/SK, 80/80/SK, 80/40 and 80/80 screw elements, respectively, which increases the speed of conveyance of the heat treated ingredients and thereby reduce the compressive pressure on the ingredients as well as the degree of fill within the bore 23 immediately below the second dry ingredient feed port 31.

Accordingly, a relatively large quantity of a dry ingredient, e.g., crystalline sugar, can be added to the material flow through the second dry ingredient feed port 31 inasmuch as the degree of fill has been reduced by the action of the screw elements 64-68 to provide sufficient free volume within the screw channel 23. In addition, the increased speed of conveyance caused by the screw elements 64-68 rapidly moves the added crystalline sugar downstream from the second feed port 31 to prevent back fill flow out of the second feed port 31.

The crystalline sugar and water are added after the high temperature mixing of the ingredients 30, which occurs in barrel sections 11-16, and are, therefore, not exposed to processing conditions which can cause oil separation and excessive dissolution of the sugar.

Screw elements 69-71 are arranged downstream from the screw elements 64-68 and comprise one 60/60 and two 30/30 elements, respectively, to reduce the speed of conveyance and again gradually increase the degree of fill. A kneading block element 72, which comprises a KB/45/5/20 element, is provided downstream from the screw elements 69-71 to mix the added sugar and added water into the other heat-treated ingredients.

Two additional screw elements 73, 74, which comprise a 40/40 and 80/160 element, respectively, convey the ingredients to a final kneading block element 75, which comprises a KB/45/5/60 element for final mixing of the ingredients. The kneading block elements 72, 75 provide the final mixing zone of the extruder.

The final elements of the twin screws 24, 25 comprise screw elements 76-78, which include an 80/80, a 60/60 and a 60/120 element, respectively. These elements convey the ingredients to an extrusion die plate 79 and develop sufficient pressure within the ingredients to force the ingredients through the extrusion die, without moisture flashing and without oil separation, as a partially baked and uniformly mixed, homogeneous cookie dough-like mass which can thereafter be shaped, formed and cut before final baking.

Referring once again to FIG. 1, a wire cutter 200 or other suitable device is arranged adjacent the downstream end of the extruder 10 to cut individual cookie products from the output of the extruder 10. These products are dropped onto a conveyor 300 which transports the material into a microwave device 301 for final baking. The products are exposed to microwave energy for approximately 1 minute to provide the final baked cookie product.

The heating of the pieces of the partially baked, extruded dough in a microwave oven is performed so that proper leavening and browning is achieved. The heating of the pieces or cookie preforms in the post extrusion, microwave oven should be sufficient to result in an internal temperature of at least about 160° F., more preferably at least about 190° F. in the cookie. The microwave energy may be applied at atmospheric pressure, above atmospheric pressure or under vacuum.

The following table illustrates the basic ingredients for a cookie dough and representative and preferred ranges of each ingredient as a percentage of the total weight of the dough:

| Ingredient | Representative Range | Preferred Range |
| --- | --- | --- |
| Flour (about 12% by weight water) | 30%-70% | 45%-55% |
| Water (including water content of the flour) | <20% | <15% |
| Oil (shortening or fat) | 12%-40% | 15%-25% |
| Sucrose (crystalline sugar) | 10%-40% | 15%-30% |

As discussed above, the flour and oil are input through the first dry ingredient port 30 and first liquid feed 32, respectively, and are subjected to vigorous mixing and heat treatment in barrel sections 12-16. The added water, i.e., for example, from about 0.5% by weight to about 10% by weight of the total dough mix, is input through the second liquid feed port 33. The total water of >20% and preferably >15% by weight is therefore not provided until after the vigorous mixing and heat treatment of the ingredients comprising flour and oil to minimize oil separation. The added water input through the second liquid feed port 33 is gently mixed with the heat treated ingredients to provide the dough mass consistency required for forming and cutting.

The crystalline sugar is added either through the second dry ingredient feed port 31 or partially through the downstream second dry ingredient feed port 31 and partially through the upstream first dry ingredient feed port 30. The ratio of upstream to downstream sugar addition is for example 15% to 85% of the total crystalline sugar through each of the dry ingredient feed ports 30,31. The crystalline sugar added upstream is subjected to vigorous mixing and heat treatment and will tend to provide a crunchy texture to the final product. The amount of crystalline sugar added upstream will be a function of the desired crunchiness of the final product. The upstream added crystalline sugar will not undergo excessive dissolution to provide a hard texture to the final product or contribute to oil separation during heat treatment processing because the total water of the mixture prior to the downstream addition of the added water is not sufficient to dissolve a substantial amount of the upstream added crystalline sugar.

The crystalline sugar added downstream is advantageous in providing a tender texture for the final product. Moreover, the bulk of the downstream added crystalline sugar is not heat treated which enables the attainment of a higher product temperature for the ingredients which are input through the first dry ingredient feed port 30 and subjected to heat treatment for a given throughput rate. The downstream added crystalline sugar is also relatively cool and provides a cooling mass to the heat treated ingredients to lower the temperature of the ingredients just prior to the input of the added water through the second liquid feed port 33 and thereby reduce the possibility of oil separation upon the introduction and mixing of the added water.

The flour may be replaced in whole or in part by flour substitutes or bulking agents including bran. Other ingredients may also be added to the formulation such as emulsifiers, sources of protein, a leavening agent and other ingredients conventionally employed in cookies. Heat sensitive ingredients and particulate ingredients may also be added downstream from the heat treatment and vigorous mixing zones of the extruder. If aspartame is added, a bulking agent such as a grain bran can be used to replace all or a portion of the crystalline sugar. Sugars in liquid form or other sweeteners may also be used with or in place of a crystalline sugar.

The following are examples of the operation of an extruder built in accordance with the invention and operated to mix and heat treat a dough formulation having a cookie-crumb-structure upon final baking.

EXAMPLE I

The below listed ingredients were fed to the extruder at rates to provide a product formulation having the following final percentage by weight of the output dough product (including where each ingredient was added to the extruder):

| Formulation Mix | % wt of Final Output Product | Addition to Extruder |
|---|---|---|
| Wheat Flour, bleached (about 12% by weight water) | 49.26% | First Dry Feed Port 30 |
| Non-fat Dry Milk (about 52% by weight lactose) | 1.48% | First Dry Feed Port 30 |
| Salt | 0.74% | First Dry Feed Port 30 |
| White Sugar (sucrose), granulated | 14.78% | Second Dry Feed Port 31 |
| Brown Sugar (about 89% sucrose, 3% invert, 4% non-sugar solids, 3% water) | 6.89% | Second Dry Feed Port 31 |
| Soybean Spray Oil | 24.63% | First Liquid Feed Port 32 |
| Added Water (tap water) | 2.22% | Second Liquid Feed Port 33 |

The extruder comprised a Werner and Pfleiderer ZSK-57 extruder including twelve barrel sections, each including a heating element and cooling means, and twin screws, each having a screw configuration according to the invention, as illustrated in FIG. 4. The extruder was also arranged to have first and second dry ingredient feed ports and first and second liquid feed ports, pursuant to the invention, as described above.

The first barrel 11, which contained the first dry feed port 30, was set on constant cool to obtain an actual barrel temperature of less than about 100° F. The remaining eleven barrels were divided into 7 separately measured barrel temperature zones. Barrels 12 and 13 corresponded to temperature zone 1, barrel 14 corresponded to temperature zone 2, barrels 15 and 16 corresponded to temperature zone 3, barrel 17 corresponded to temperature zone 4, barrel 18 corresponded to temperature zone 5, barrels 19 and 20 corresponded to zone 6 and barrels 21 and 22 corresponded to zone 7.

Barrels 12 through 16 were set to heat to 350° F., barrel 17 to 200° F., barrel 18 was set on constant cool, barrels 19 and 20 were set at 100° F. and barrels 21 and 22 were set at 120° F.

The ingredients were treated at a temperature above the minimum gelatinization temperature of the starch (assuming that a sufficient amount of water was available for reaction with the starch) but no or substantially no gelatinization (measured by differential scanning calorimetry) occurred. It is believed that the oil sufficiently coated the starch containing flour particles to prevent substantial penetration of moisture into the starch granules so as to avoid substantial gelatinization.

The screws were rotated at about 125 rpm at about 2% of maximum torque. The ingredients were fed in their relative amounts to provide a throughput or mass flow rate of the dough-like mixture extrudate of about 405 lbs/hr.

The wheat flour, non-fat dry milk and salt and was prepared by mixing the ingredients to obtain a substantially homogeneous dry blend. The dry blend was continuously fed to the first dry feed port. The white and brown sugar was prepared by mixing the ingredients to obtain a second substantially homogenous dry blend which was continuously fed downstream to the second dry feed port. The oil was prepared by melting semi-solid soybean spray oil to obtain a liquid oil which was continuously fed to the first liquid feed port. The tap water was continuously fed to the second liquid feed part.

On a calculated basis, the water content of the dough-like mixture formed in the extruder was about 8.3% by weight, based upon the total weight of the dough-like mixture.

At steady state, the barrel set temperatures and the actual barrel temperatures were:

| Barrel # | Barrel Set Temperature, °F. | Actual Barrel Temperature. °F. |
|---|---|---|
| 11 | cool | <100 |
| 12 | 350 | 206 |
| 13 | 350 | — |
| 14 | 350 | 245 |
| 15 | 350 | 324 |
| 16 | 350 | — |
| 17 | 200 | 201 |
| 18 | cool | <100 |
| 19 | 100 | <100 |
| 20 | 100 | — |
| 21 | 120 | 115 |
| 22 | 120 | — |

The pressure in the extruder was less than about 10 bars. The average or median residence time of the ingredients heated prior to addition of the sugar and the tap water at the second feed ports was about 40–50 seconds. The average or median residence time of the ingredients in the extruder from the second feed ports to the extrusion die was about 10 to 20 seconds.

The substantially homogeneous dough-like mixture formed in the extruder was extruded through a horizontally oriented slit die (about 5 mm high by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1¼".

Six pieces having an average weight of about 4.2 gm/piece were subjected to microwave energy in a dielectric oven set at 81% power for 45 seconds for final baking to produce distinctly leavened cookies having dimensions of about 1⅜" by about 1¼". The cookies were surface browned and had a crumb-like structure and crumb-like texture. The pH of the cookies was about 5.4.

EXAMPLE II

The below listed ingredients may be fed to the extruder at rates to provide a product formulation having the following final percentages by weight of the output dough product (including where each ingredient is to be fed to the extruder):

| Formulation Mix | % wt of Final Output Product | Addition to Extruder |
| --- | --- | --- |
| Wheat Flour, bleached (about 12% by weight water) | 48.66% | First Dry Feed Port 30 |
| Non-fat Dry Milk (about 52% by weight lactose) | 1.46% | First Dry Feed Port 30 |
| Salt | 0.73% | First Dry Feed Port 30 |
| White Sugar (sucrose), granulated | 14.60% | First Dry Feed Port 30 |
| Brown Sugar (about 89% sucrose, 3% invert, 4% non-sugar solids, 3% water) | 6.81% | Second Dry Feed Port 31 |
| Sodium bicarbonate | 1.22% | Second Dry Feed Port 31 |
| Soybean Spray Oil | 24.33% | First Liquid Feed Port 32 |
| Tap Water | 2.19% | Second Liquid Feed Port 33 |

The extruder may comprise the same equipment and same screw configuration as in Example I. The screws may be rotated at about 125 rpm at about 2% of maximum torque. The ingredients may be fed in their relative amounts to provide a throughput or mass flow rate of the dough-like mixture extrudate of about 405 lbs/hr.

The flour, non-fat dry milk, salt and white sugar may be prepared by mixing the ingredients to obtain a substantially homogeneous dry blend. The dry blend may be continuously fed to the first dry feed port. The brown sugar and sodium bicarbonate as a leavening agent may be prepared by mixing the ingredients to obtain a second substantially homogenous dry blend which may be continuously fed downstream to the second dry feed port. The oil may be prepared by melting semi-solid soybean spray oil to obtain a liquid oil which may be continuously fed to the first liquid feed port. The tap water may be continuously fed to the second liquid feed port.

On a calculated basis, the water content of the dough-like mixture formed in the extruder should be about 8.2% by weight, based upon the total weight of the dough-like mixture.

The barrel set temperatures, pressures, and residence times may be the same as in Example I.

The substantially homogeneous dough-like mixture formed in the extruder may be extruded through a horizontally oriented slit die (about 5 mm high by about 50 mm wide) to obtain a continuous, substantially unleavened ribbon having a temperature upon exiting the extruder of less than about 150° F. The ribbon may be cut into cylindrical pieces having a diameter of about 1¼".

Six pieces were subjected to microwaving in a microwave oven for about 50 seconds for final baking to produce distinctly leavened cookies. The cookies were surface browned and had a crumb-like structure and texture.

Other commercially available extruders which may be modified to provide an extruder according to the invention include models of WENGER Series TX by Wenger of Sabetha, Kans.; models of MPF Series by Baker Perkins; models of BC Series by Creusot Loire of Paris, France, single screw extruders including e.g. a Buss single screw extruder, comprising a horizontally oscillating screw during rotation and models of Series CONTINUA extruders marketed by Werner and Pfleiderer.

What is claimed is:

1. An extruder, which comprises
   a housing including a screw channel formed along the longitudinal axis of the housing;
   at least one screw-type element rotatably received within the screw channel to convey and mix ingredients;
   a feed port means arranged in the housing adjacent the upstream end thereof to input ingredients into the screw channel for conveyance and mixing by the screw-type element;
   means for inputting at least certain ingredients of a cookie-like dough formulation, including oil and flour, with less than a preselected total water content, by weight, of the ingredients;
   the means for inputting being coupled to the feed port means;
   an added water inlet port arranged in the housing downstream from the feed port means to input water into the screw channel;
   a vigorous mixing zone formed by the screw channel and screw-type element intermediate the feed port means and the added water inlet port to vigorously mix and convey the ingredients input into the feed port means;
   a temperature control means operating to elevate the temperature of the screw channel for heat treatment of the ingredients input into the feed port means in a heat treatment zone of the housing extending intermediate the feed port means the added water inlet port;
   a source of water coupled to the added water inlet port to add a preselected amount of water through the added water inlet port to increase the water content and modify the consistency of the ingredients input into the feed ports means at a location in the screw channel downstream from the vigorous mixing and heat treatment zones;

a mixing zone formed by the screw channel and screw-type element downstream from the added water inlet port and operating to mix the added water throughout the heat treated ingredients under pressure and temperature conditions to avoid substantial oil separation from the heat treated ingredients and added water; and an output means at the downstream most end of the housing; and a microwave device coupled to the output means of the extruder to receive and further heat treat the ingredients output by the output means.

2. The extruder of claim 1 further comprising a downstream dry ingredient feed port arranged adjacent to the added water inlet port.

3. The extruder of claim 2 further comprising a means for inputting crystalline sugar coupled to the downstream dry ingredient feed port.

4. The extruder of claim 3 wherein the screw-type element forms a high speed conveyance zone beneath the downstream dry ingredient inlet port for rapid intake of the crystalline sugar into the screw channel.

5. The extruder of claim 1 wherein the screw-type element comprises a sequence of elements upstream from the added water inlet port including, in downstream order, a shuffle kneader, an alternating sequence of screw elements and igel elements followed by an alternating sequence of screw elements and kneading block elements, the sequence of elements operating to vigorously mix and convey the ingredients input through the feed port means prior to input of the added water, the sequence of elements upstream from the added water inlet port together with the screw channel comprising the vigorous mixing zone.

6. The extruder of claim 5, wherein the screw-type element comprises a sequence of elements downstream from the added water inlet port, including, in downstream order, an alternating sequence of screw elements and kneading elements to mix and convey the ingredients input through the feed port means and added water input through the added water inlet port at low pressure and low temperature, relative to the vigorous mixing and heat treatment zones, the sequence of elements downstream from the added water inlet port together with the screw channel comprising the mixing zone.

7. The extruder of claim 6 further comprising at least one high speed conveyance screw element arranged at the upstream end of the sequence of elements downstream from the added water inlet port.

8. The extruder of claim 7 further comprising a downstream dry ingredient inlet port formed in the housing above the at least one high speed conveyance screw element and adjacent the added water inlet port.

9. The extruder of claim 1 wherein the feed port means comprises a dry ingredient feed port adjacent to a liquid feed port.

10. The extruder of claim 1 wherein the extruder comprises a twin screw extruder.

11. The extruder of claim 1 wherein the temperature control means comprises an electric heating means arranged in the housing to apply heat to the screw channel.

12. The extruder of claim 11 wherein the temperature control means further comprises a cooling water flow means arranged around the screw channel to reduce the temperature of the screw channel.

13. The extruder of claim 12 wherein the temperature control means includes a thermostat control to selectively activate the electric heating means and cooling water flow means to control the temperature of the screw channel.

14. The extruder of claim 1 further comprising a cooling means arranged on the housing adjacent the added water inlet port on the upstream side thereof to cool the screw channel immediately upstream from the added water inlet port.

15. An extruder, which comprises
a housing including a screw channel formed along the longitudinal axis of the housing;
at least one screw-type shaft rotatably received within the screw channel;
the housing including a first dry ingredient feed port arranged adjacent the upstream end of the housing and a second dry ingredient feed port spaced downstream from the first dry ingredient feed port;
a temperature control means operating to elevate the temperature of the screw channel in a heat treatment zone intermediate the first and second dry ingredient feed ports;
the screw-type shaft being arranged and configured upstream from the second dry ingredient feed port to convey and vigorously mix dry ingredients input at the first dry ingredient feed port;
means to input dry ingredients through the first and second dry ingredient feed ports;
the screw type shaft being arranged to provide a high speed conveyance element directly below the second, dry ingredient feed port; and
a mixing zone formed by the screw channel and screw-type element downstream from the second dry ingredient feed port and operating to provide low pressure and low temperature mixing and conveying, relative to the vigorous mixing by the screw-type shaft upstream from the second dry ingredient feed port, of the ingredients input through the first and second dry ingredient feed ports; and
a microwave device coupled to the output means of the extruder to receive and heat treat the ingredients output by the output means.

16. The extruder of claim 15 further including a liquid feed port adjacent to the second downstream dry ingredient feed port.

17. An extruder which comprises:
a housing including a screw channel formed along the longitudinal axis of the housing;
at least one screw-type element rotatably received in the screw channel for conveyance and mixing of ingredients;
a feed port means arranged in the housing at the upstream end thereof to input ingredient into the screw channel for conveyance and mixing by the screw-type element;
an added water inlet port arranged in the housing intermediate the upstream most and downstream most ends of the housing;
the screw-type element being configured to provide a vigorous mixing and conveying action on ingredients input through the feed port means upstream from the added water inlet port and a gentle mixing and conveying action on the ingredients downstream from the added water inlet port;
a source of water coupled to the added water inlet port; and
a temperature control means operating to elevate the temperature of the screw channel along the length of the screw channel adjacent the screw-type element upstream from the added water inlet port; and
a microwave device coupled to the output means of the extruder to receive and heat treat the ingredients output by the output means.

* * * * *